US011359083B2

(12) United States Patent
Bhadane et al.

(10) Patent No.: US 11,359,083 B2
(45) Date of Patent: Jun. 14, 2022

(54) THERMOPLASTIC VULCANIZATES

(71) Applicant: Celanese International Corporation, Irving, TX (US)

(72) Inventors: Prashant Bhadane, Houston, TX (US); Toshiaki Yamaguchi, Kanagawa (JP); Eric Paul Jourdain, Rhode Saint Genese (BE); Hang Dong, Shanghai (CN); Weiqian Zhang, Shanghai (CN); Oscar Oansuk Chung, Houston, TX (US)

(73) Assignee: Celanese International Corporation, Irving, TX (US)

(*) Notice: Subject to any disclaimer, the term of this patent is extended or adjusted under 35 U.S.C. 154(b) by 0 days.

(21) Appl. No.: 16/963,436

(22) PCT Filed: Dec. 7, 2018

(86) PCT No.: PCT/US2018/064514
§ 371 (c)(1),
(2) Date: Jul. 20, 2020

(87) PCT Pub. No.: WO2019/143420
PCT Pub. Date: Jul. 25, 2019

(65) Prior Publication Data
US 2021/0040299 A1    Feb. 11, 2021

Related U.S. Application Data

(60) Provisional application No. 62/618,787, filed on Jan. 18, 2018.

(51) Int. Cl.
*C08L 23/16* (2006.01)
*C08L 23/12* (2006.01)
*C08L 23/14* (2006.01)

(52) U.S. Cl.
CPC ............... *C08L 23/16* (2013.01); *C08L 23/12* (2013.01); *C08L 23/14* (2013.01); *C08L 2205/035* (2013.01); *C08L 2205/22* (2013.01)

(58) Field of Classification Search
CPC .......... C08L 23/12; C08L 23/16; C08L 23/14; C08L 83/04; C08L 2205/035; C08L 2205/22
See application file for complete search history.

(56) References Cited

U.S. PATENT DOCUMENTS

| 2004/0014888 A1* | 1/2004 | Fournier ................. C08L 83/04 525/100 |
| 2008/0182939 A1 | 7/2008 | Morikawa et al. |
| 2011/0198778 A1* | 8/2011 | Bellmore ................ B29C 66/43 264/238 |
| 2011/0281984 A1* | 11/2011 | Garois .................... C08L 23/14 524/168 |
| 2012/0015202 A1 | 1/2012 | Kenens et al. |
| 2014/0057118 A1 | 2/2014 | Honda |
| 2015/0056457 A1 | 2/2015 | Kerstetter, III et al. |
| 2020/0362148 A1 | 11/2020 | Bhadane et al. |

OTHER PUBLICATIONS

Shin Etsu: "New Products Guide—Silicones to Highly Functionalize Plastics-", Feb. 7, 2019, XP002789474.
"Dow Corning MB50-314 Masterbatch", Jan. 15, 2001, XP002789475.

* cited by examiner

*Primary Examiner* — Jeffrey C Mullis
(74) *Attorney, Agent, or Firm* — Dority & Manning, P.A.

(57) ABSTRACT

A thermoplastic vulcanizate composition comprises: (i) a dispersed phase of rubber that is at least partially cured; (ii) a continuous thermoplastic phase including at least one thermoplastic polymer; (iii) a first polysiloxane comprising a migratory liquid siloxane polymer; and (iv) a second polysiloxane comprising a non-migratory siloxane polymer bonded to a thermoplastic material.

21 Claims, No Drawings

THERMOPLASTIC VULCANIZATES

CROSS-REFERENCE OF RELATED APPLICATIONS

This application is a National Phase Application claiming priority to PCT Application Serial No. PCT/US2018/064514, filed Dec. 7, 2018 which claims the benefit of priority from U.S. Provisional Application No. 62/618,787, filed Jan. 18, 2018, the disclosures of which are hereby incorporated by reference in their entirety.

FIELD

This present disclosure relates to thermoplastic vulcanizates, their manufacture and use.

BACKGROUND

Thermoplastic vulcanizates (TPVs) are a diverse family of rubber-like materials that exhibit properties of both thermoset rubbers and thermoplastic materials. TPVs show superior aging performance and chemical resistance like thermosets but are easily processed and recyclable within the manufacturing process like thermoplastics. TPVs generally comprise dynamically vulcanized rubber, such as ethylene propylene diene terpolymer (EPDM) rubber, in a thermoplastic matrix comprising a thermoplastic polyolefin such as polypropylene (PP). The TPV looks, feels and behaves like rubber but, due to the thermoplastic content, offers simple, flexible part design and manufacturing.

One growing application for TPVs is to replace or augment the rubber profiles used in many different automotive applications, including: weatherseals, gaskets, glass encapsulation, and end-caps. Modern day automotives demand increasingly complex shapes for these applications, as well as the use of different molding techniques, e.g., extrusion and injection molding. By allowing rapid thermoplastic processing with thermoset rubber performance, thermoplastic vulcanizates (TPVs) are gaining popularity for such uses. For example, extruded profiles formed of a (foamed) thermoset rubber or a TPV, may joined in a mold by injecting a TPV formulation between the profiles. For such an application, the injected material needs to develop a strong bond with the profile substrates. For sealing purposes, the resulting component may press and remain in contact with other rubber seals, painted metal surfaces, or glass surfaces depending upon the application. When the automotive is in motion, these surfaces may rub against each other and produce undesirable friction and noise. Thus, there is an additional requirement for these applications of a low surface coefficient of friction (COF).

As a result, there is significant interest in developing TPV materials having low COF properties. However, additives formulated to lower COF may interfere with the ability of the host TPV material to form strong bonds with other substrates. In addition, slip additives tend to migrate to the surface of components, which can lead to undesirable stains, tacky surfaces and a general degradation of surface aesthetics. These effects are often more pronounced at higher temperatures. Moreover, some slip agents interfere with TPV curing chemistry and need to be added separately in a two-step process, which increases cost. Hence a well-balanced solution based on one-step TPV manufacturing technology with good material properties, including: low hardness and compression set, good flow, reasonable material strength, along with low COF, high bonding strength, and better surface aesthetics is desirable.

For example, US Publication No. 2012/0015202A1 discloses a thermoplastic elastomer comprising: (a) a thermoplastic phase comprising a propylene-based copolymer having: a heat of fusion of less than 75 J/g, and a $T_m$ of less than 105° C.; (b) from about 0.1 to about 10.0 weight percent of a siloxane masterbatch; and (c) a rubber. The siloxane masterbatch is added as a micro-dispersion in a carrier resin, such as polyethylene, polypropylene, or a combination thereof, and its addition is aid to impart improved surface properties, including better lubricity, gloss and slip, and improved mar resistance and scratch resistance.

In addition, US Publication No. 2015/0056457A1 discloses a composition useful as a slip coating, for example, for a weatherseal, comprising: (i) a dispersed phase of rubber that is at least partially cured; (ii) a continuous thermoplastic phase including at least one thermoplastic polymer; (iii) a first polysiloxane having a number average molecular weight greater than 100 kg/mole; and (iv) a second polysiloxane having a number average molecular weight less than 100 kg/mole.

SUMMARY

According to the present disclosure, it has now been found that, by adding a combination of a certain migratory or exuding type siloxane and a non-migratory or non-exuding type siloxane where the siloxane molecule is bonded to a thermoplastic molecule, it is possible to produce in a one-step compounding process a TPV product with built-in low COF, high bonding properties along with improved surface aesthetics and a desirable balance of other physical properties, such as: high flow, compression set, and material strength.

Thus, in one aspect, the present disclosure resides in a thermoplastic vulcanizate composition comprising: (i) a dispersed phase of rubber that is at least partially cured; (ii) a continuous thermoplastic phase including at least one thermoplastic polymer; (iii) a first migratory liquid siloxane polymer; and (iv) a second non-migratory, siloxane polymer bonded to a thermoplastic material.

In a further aspect, the present disclosure resides in a process for producing a thermoplastic vulcanizate composition, the process comprising:

(a) supplying to a mixer at least the following components: (i) a cross-linkable rubber, (ii) a thermoplastic polymer, (iii) a first migratory liquid siloxane polymer and (iv) a second non-migratory, siloxane polymer bonded to a thermoplastic material; and (b) mixing the components under conditions such that the thermoplastic polymer melts and the rubber is at least partially cross-linked to produce a heterogeneous product comprising particles of the at least partially cross-linked rubber dispersed in a matrix comprising the thermoplastic polymer.

In yet a further aspect, the present disclosure resides in an automotive component comprising the thermoplastic vulcanizate composition described herein.

DETAILED DESCRIPTION OF THE EMBODIMENTS

Described herein are thermoplastic vulcanizate compositions that include an at least partially-cured rubber phase dispersed within a continuous thermoplastic phase and at least first and second different polysiloxanes, as well as other optional ingredients, for example fillers and extenders. The first polysiloxane comprises a migratory siloxane polymer which is liquid at room temperature (25° C.) and atmospheric pressure, while the second polysiloxane comprises a non-migratory, siloxane polymer bonded to a thermoplastic material. The compositions disclosed herein have a desirable combination of low COF, good bonding properties and excellent surface aesthetics, even at temperatures as high as 120° C., making them useful in producing automotive body components, such as glass run channel corner mold, belt line seal end cap, cut line seal, gap filler, fuel door seals, body sealing low friction skin, weather seals, gaskets, glass encapsulation, end-caps and others.

With regard to the difference in migratory nature between the first and second polysiloxanes, it is known that siloxane molecules are physically driven to migrate to the surface of polymer components due to inherent incompatibility with the non-polar polyolefinic materials. This physical, molecular migration to the surface can be retarded with the increase in polysiloxane molecular weight, by altering the chemical makeup of the molecular, or, in the case of the second polysiloxane, by chemically reacting it to a molecule of choice such as a polyolefin thermoplastic. As now the siloxane molecule is chemically attached to the thermoplastic molecule, it prevents the physical migration of siloxane molecule to the surface of the materials and is, therefore, referred as a non-migratory slip agent. When such molecule is present in the system together with the first polysiloxane, it has now been found that migration of the first polysiloxane to the surface is reduced, apparently by increasing its compatibility with the base polymeric material and yet the siloxane combination is very effective in reducing COF properties of a TPV formulation without effecting its bonding performance and surface quality.

Rubber Phase

The rubbers that may be employed to form the rubber phase of the present composition include those polymers that are capable of being cured or cross-linked. Reference to a rubber may include mixtures of more than one rubber. Non-limiting examples of rubbers include olefinic elastomeric copolymers, butyl rubber, and mixtures thereof. In one or more embodiments, olefinic elastomeric copolymers include ethylene-propylene-non-conjugated diene rubbers or propylene-based rubbery copolymers containing units derived from non-conjugated diene monomers.

The term ethylene-propylene rubbers refers to rubbery copolymers polymerized from ethylene, propylene, and at least one diene monomer. The diene monomers may include, but are not limited to, 5-ethylidene-2-norbornene; 5-vinyl-2-norbornene; divinylbenzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof.

The ethylene-propylene rubber may include from about 40 to about 85% by weight, or from about 50 to about 70% by weight, or from about 60 to about 66% by weight of units derived from ethylene based on the total weight of ethylene and propylene in the rubber. In addition, the rubber may contain from about 0.1 to about 15% by weight, or from about 0.5 to about 12% by weight, or from about 1 to about 10% by weight, or from about 2 to about 8% by weight of units derived from diene monomer. Expressed in mole percent, the rubber may include from about 0.1 to about 5 mole percent, or from about 0.5 to about 4 mole percent, or from about 1 to about 2.5 mole percent units derived from diene monomer. In one or more embodiments, where the diene includes 5-ethylidene-2-norbornene, the ethylene-propylene rubber may include at least 1% by weight, or at least 3% by weight, or at least 4% by weight, or at least 5% by weight, or from about 1 to about 15% by weight, or from about 5% to about 12% by weight, or from about 7% to about 11% by weight units deriving from 5-ethylidene-2-norbornene. In one or more embodiments, where the diene includes 5-vinyl-2-norbornene, the ethylene-propylene rubber may include at least 1% by weight, or at least 3% by weight, or at least 4% by weight, or at least 5% by weight, or from about 1 to about 15% by weight, or from about 5% to about 12% by weight, or from about 7% to about 11% by weight units deriving from 5-vinyl-2-norbornene.

The ethylene-propylene rubber may have a weight average molecular weight ($M_w$) that is greater than 100,000 g/mole, or greater than 200,000 g/mole, or greater than 400,000 g/mole, or greater than 600,000 g/mole. Preferably, the $M_w$ of the ethylene-propylene rubber is less than 1,200,000 g/mole, or less than 1,000,000 g/mole, or less than 900,000 g/mole, or less than 800,000 g/mole.

Useful ethylene-propylene rubbers may have a number average molecular weight ($M_n$) that is greater than 20,000 g/mole, or greater than 60,000 g/mole, or greater than 100,000 g/mole, or greater than 150,000 g/mole. The $M_n$ of the ethylene-propylene rubbers may be less than 500,000 g/mole, or less than 400,000 g/mole, or less than 300,000 g/mole, or less than 250,000 g/mole.

Techniques for determining the molecular weight ($M_n$, $M_w$, and $M_z$) and molecular weight distribution (MWD) may be found in U.S. Pat. No. 4,540,753, which is incorporated by reference herein, and in Macromolecules, 1988, Volume 21, page 3360, by Verstrate et al., which is also herein incorporated by reference.

The ethylene-propylene rubber used herein may also be characterized by having a Mooney viscosity ($ML_{(1+4)}$ at 125° C.) per ASTM D-1646, of from about 10 to about 500, or from about 50 to about 450.

In some embodiments, the ethylene-propylene rubber may be characterized by having an intrinsic viscosity, as measured in decalin at 135° C. per ASTM D-1601, of from about 1 to about 8 dl/g, or from about 3 to about 7 dl/g, or from about 4 to about 6.5 dl/g.

In some embodiments, the ethylene-propylene rubber used herein may have a glass transition temperature ($T_g$), as determined by Differential Scanning calorimetry (DSC) according to ASTM E-1356, that is less than −20° C., in other embodiments less than −30° C., in other embodiments less than −50° C., and in other embodiments from about −20 to about −60° C.

Suitable ethylene-propylene rubbers may be manufactured or synthesized by using a variety of techniques. For example, these copolymers can be synthesized by employing solution, slurry, or gas phase polymerization techniques that employ various catalyst systems. Exemplary catalysts include Ziegler-Natta systems such as those including vanadium catalysts, and single-site catalysts including constrained geometry catalysts involving Group IV-VI metallocenes. Elastomeric copolymers are commercially available under the tradenames Vistalon™ (ExxonMobil Chemical Co.; Houston, Tex.), Keltan™ (Lanxess), Nordel IP™ (Dow), Nordel MG™ (Dow), Royalene™ (Lion Copolymer) and Buna™ (Lanxess).

Generally, the rubber phase comprises from 10 to 80 wt %, such as from 15 to 70 wt %, such as from 20 to 60 wt % of the total weight of the thermoplastic vulcanizate composition.

The rubber is at least partially cured by employing dynamic vulcanization techniques. Dynamic vulcanization refers to a vulcanization or curing process for a rubber contained in a blend that includes the rubber and at least one thermoplastic resin. The rubber is vulcanized under conditions of shear and extension at a temperature at or above the melting point of the thermoplastic resin. The rubber is preferably simultaneously cross-linked and dispersed (preferably as fine particles) within the thermoplastic resin matrix, although other morphologies, such as co-continuous morphologies, may exist depending on the degree of cure, the rubber to plastic viscosity ratio, the intensity of mixing, the residence time, and the temperature.

After dynamic vulcanization, the rubber is in the form of finely-divided and well-dispersed particles of vulcanized or cured rubber within a continuous thermoplastic phase or matrix, although a co-continuous morphology is also possible. In those embodiments where the cured rubber is in the form of finely-divided and well-dispersed particles within the thermoplastic medium, the rubber particles typically have an average diameter that is less than 50 µm, or less than 30 µm, or less than 10 µm, or less than 5 µm, or less than 1 µm. In preferred embodiments, at least 50%, or at least 60%, or at least 75% of the rubber particles have an average diameter of less than 5 µm, or less than 2 µm, or less than 1 µm.

The rubber within the composition is preferably at least partially cured. In one or more embodiments, the rubber is advantageously completely or fully cured. The degree of cure can be measured by determining the amount of rubber that is extractable from the thermoplastic vulcanizate by using cyclohexane or boiling xylene as an extractant. Preferably, the rubber has a degree of cure where not more than 15 weight percent, or not more than 10 weight percent, or not more than 5 weight percent, or not more than 3 weight percent is extractable by cyclohexane at 23° C. as described in U.S. Pat. Nos. 4,311,628, 5,100,947 and 5,157,081, all of which are incorporated herein by reference. Alternatively, the rubber has a degree of cure such that the crosslink density is at least $4 \times 10^{-5}$, or at least $7 \times 10^{-5}$, or at least $10 \times 10^{-5}$ moles per milliliter of rubber. See Crosslink Densities and Phase Morphologies in Dynamically Vulcanized TPEs, by Ellul et al., Rubber Chemistry and Technology, Vol. 68, pp. 573-584 (1995).

The rubber may be dynamically vulcanized by employing various cure systems, which are known in the art. For example, phenolic resin, hydrosilation (a.k.a. silicon-containing cure systems), and free radical cure systems may be employed.

Useful phenolic cure systems are disclosed in U.S. Pat. Nos. 2,972,600, 3,287,440, 5,952,425 and 6,437,030, which are incorporated herein by reference. In one or more embodiments, phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms.

Useful phenolic resins may be obtained under the tradenames SP-1044, SP-1045 (Schenectady International; Schenectady, N.Y.), which may be referred to as alkylphenol-formaldehyde resins.

An example of a phenolic resin curative includes that defined according to the general formula:

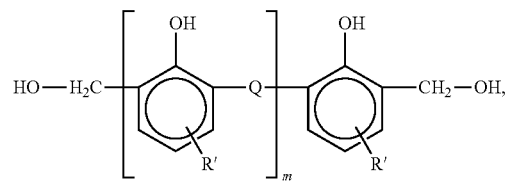

where Q is a divalent radical selected from the group consisting of —CH$_2$—, —CH$_2$—O—CH$_2$—; m is zero or a positive integer from 1 to 20 and R' is an organic group. In one embodiment, Q is the divalent radical —CH$_2$—O—CH$_2$—, m is zero or a positive integer from 1 to 10, and R' is an organic group having less than 20 carbon atoms. In other embodiments, m is zero or a positive integer from 1 to 10 and R' is an organic radical having between 4 and 12 carbon atoms.

The phenolic resin may be employed in an amount from about 2 to about 6 parts by weight, or from about 3 to about 5 parts by weight, or from about 4 to about 5 parts by weight per 100 parts by weight of rubber.

A complementary amount of stannous chloride may include from about 0.5 to about 2.0 parts by weight, or from about 1.0 to about 1.5 parts by weight, or from about 1.2 to about 1.3 parts by weight per 100 parts by weight of rubber. In conjunction therewith, from about 0.1 to about 6.0 parts by weight, or from about 1.0 to about 5.0 parts by weight, or from about 2.0 to about 4.0 parts by weight of zinc oxide may be employed. In one or more embodiments, the olefinic rubber employed with the phenolic curatives includes diene units deriving from 5-ethylidene-2-norbornene.

Silicon-containing cure systems may include silicon hydride compounds having at least two SiH groups. Useful silicon hydride compounds include, but are not limited to, methylhydrogenpolysiloxanes, methylhydrogendimethylsiloxane copolymers, alkylmethyl-co-methylhydrogenpolysiloxanes, bis(dimethylsilyl)alkanes, bis(dimethylsilyl)benzene, and mixtures thereof.

Useful catalysts for hydrosilylation include, but are not limited to, transition metals of Group VIII. These metals include, but are not limited to, palladium, rhodium, and platinum, as well as complexes of these metals. Useful silicon-containing curatives and cure systems are disclosed in U.S. Pat. No. 5,936,028.

The silane-containing compounds may be employed in an amount from about 0.5 to about 5.0 parts by weight, or from about 1.0 to about 4.0 parts by weight, or from about 2.0 to about 3.0 parts by weight per 100 parts by weight of rubber. A complementary amount of catalyst may include from about 0.5 to about 20.0 parts, or from about 1.0 to about 5.0 parts, or from about 1.0 to about 2.0 parts of metal per million parts by weight of the rubber. In one or more embodiments, the olefinic rubber employed with the hydrosilylation curatives includes diene units deriving from 5-vinyl-2-norbornene.

The cure system employed in practicing the present process may include a free-radical cure agent and a coagent. Free-radical cure agents include peroxides such as organic peroxides. Examples of organic peroxides include, but are not limited to, di-tert-butyl peroxide, dicumyl peroxide, t-butylcumyl peroxide, α,α-bis(tert-butylperoxy)diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy)valerate, benzoyl peroxide, lauroyl peroxide, dilauroyl peroxide, 2,5-dimethyl-2,5-di(tert-butylperoxy) hexyne-3, and mixtures thereof. Also, diaryl peroxides, ketone peroxides, peroxydicarbonates, peroxyesters, dialkyl peroxides, hydroperoxides, peroxyketals and mixtures thereof may be used.

Useful peroxides and their methods of use in dynamic vulcanization of thermoplastic vulcanizates are disclosed in U.S. Pat. No. 5,656,693, which is incorporated herein by reference.

The coagent may include a multi-functional acrylate ester, a multi-functional methacrylate ester, or combination thereof. In other words, the coagents include two or more organic acrylate or methacrylate substituents. Examples of multi-functional acrylates include diethylene glycol diacrylate, trimethylolpropane triacrylate (TMPTA), ethoxylated trimethylolpropane triacrylate, propoxylated trimethylolpropane triacrylate, propoxylated glycerol triacrylate, pentaerythritol triacrylate, bistrimethylolpropane tetraacrylate, pentaerythritol tetraacrylate, ethoxylated pentaerythritol tetraacrylate, ethoxylated pentaerythritol triacrylate, cyclohexane dimethanol diacrylate, ditrimethylolpropane tetraacrylate, or combinations thereof. Examples of multi-functional methacrylates include trimethylol propane trimethacrylate (TMPTMA), ethylene glycol dimethacrylate, butanediol dimethacrylate, butylene glycol dimethacrylate, diethylene glycol dimethacrylate, polyethylene glycol dimethacrylate, allyl methacrylate, or combinations thereof.

Thermoplastic Phase

The thermoplastic resin phase includes those thermoplastic polymers that include solid, generally high molecular weight plastic resins. Exemplary thermoplastic polymers include crystalline, semi-crystalline, and crystallizable polyolefins, olefin homo and copolymers, and non-olefin resins.

The thermoplastic polymer may be formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are the reactor, impact, and random copolymers of propylene with ethylene or the higher α-olefins, described above, or with $C_{10}$-$C_{20}$ diolefins. Comonomer contents for these propylene copolymers may be from 1% to about 30% by weight of the polymer, for example, as in U.S. Pat. No. 6,867,260, which is incorporated by reference herein. Copolymers available under the tradename VISTAMAXX™ (ExxonMobil) are specifically included.

Other suitable polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be used. Blends or mixtures of two or more polyolefin thermoplastics such as described herein, or with other polymeric modifiers, are also suitable in accordance with this invention. Useful thermoplastic polymers may also include impact and reactor copolymers.

The thermoplastic polymer may include propylene-based polymers including those solid, generally high-molecular weight plastic resins that primarily comprise units deriving from the polymerization of propylene. In certain embodiments, at least 75%, or at least 90%, or at least 95%, or at least 97% of the units of the propylene-based polymer derive from the polymerization of propylene. In particular embodiments, these polymers include homopolymers of propylene.

In certain embodiments, the propylene-based polymers may also include units deriving from copolymerization with ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof.

The propylene-based polymers may include semi-crystalline polymers. These polymers may be characterized by a crystallinity of at least 25% by weight, or at least 55% by weight, or at least 65% by weight, or at least 70% by weight. Crystallinity may be determined by dividing the heat of fusion of a sample by the heat of fusion of a 100% crystalline polymer, which is assumed to be 290 joules/gram for polypropylene.

In one or more embodiments, the propylene-based polymers may be characterized by an $H_f$ of at least 52.3 J/g, or in excess of 100 J/g, or in excess of 125 J/g, or in excess of 140 J/g.

In one or more embodiments, useful propylene-based polymers may be characterized by an $M_w$ of from about 50 to about 2,000 kg/mole, or from about 100 to about 600 kg/mole. They may also be characterized by a $M_n$ of about 25 to about 1,000 kg/mole, or about 50 to about 300 kg/mole, as measured by GPC with polystyrene standards.

In one or more embodiments, useful propylene-based polymers can have a MFR (ASTM D-1238, 2.16 kg@230° C.) of less than 100 dg/min, or less than 50 dg/min, or less than 10 dg/min, or less than 5 dg/min. In these or other embodiments, the propylene-based polymers can have a MFR of at least 0.1 dg/min, or 0.2 dg/min, or at least 0.5 dg/min.

In one or more embodiments, useful propylene-based polymers can have a melt temperature ($T_m$) that is from about 110° C. to about 170° C., or from about 140° C. to about 168° C., or from about 160° C. to about 165° C. They may have a glass transition temperature ($T_g$) of from about −10° C. to about 10° C., or from about −3° C. to about 5° C., or from about 0° C. to about 2° C. In one or more embodiments, they may have a crystallization temperature ($T_c$) of at least about 75° C., or at least about 95° C., or at least about 100° C., or at least 105° C., or ranging from 105° C. to 130° C.

The propylene-based polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In particular embodiments, the propylene-based polymers include a homopolymer of a high-crystallinity isotactic or syndiotactic polypropylene. This polypropylene can have a density of from about 0.89 to about 0.91 g/cc, with the largely isotactic polypropylene having a density of from about 0.90 to about 0.91 g/cc. Also, high and ultra-high molecular weight polypropylene that has a fractional melt flow rate can be employed. In one or more embodiments, polypropylene resins may be characterized by a MFR (ASTM D-1238; 2.16 kg@230° C.) that is less than or equal to 10 dg/min, or less than or equal to 1.0 dg/min, or less than or equal to 0.5 dg/min.

In one or more embodiments, the thermoplastic phase includes, in addition to a polypropylene resin, a polyethylene resin. In one or more embodiments, this polyethylene resin includes at least 90%, or at least 95%, or at least 99% of the polymeric units derive from ethylene. In one or more embodiments, this polyethylene resin is a polyethylene homopolymer.

In one or more embodiments, the polyethylene used in conjunction with the polypropylene may be characterized by having a weight average molecular weight of from about 100 to 250 kg/mole, or from about 110 to 220 kg/mole, or from about 150 to 200 kg/mole. This polyethylene may be characterized by having a polydispersity that is less than 12, or less than 11, or less than 10, or less than 9.

In one or more embodiments, the polyethylene used in conjunction with the polypropylene may be characterized by having a melt index from 1.2 to 12 dg/min, or from 0.4 to 10 dg/min, or from 0.5 to 8.0 dg/min, per ASTM D-1238 at 190° C. and 2.16 kg load.

In one or more embodiments, the polyethylene used in conjunction with the polypropylene may be characterized by an intrinsic viscosity as determined per ASTM D 1601 and D 4020 that is from 0.5 to 10 dl/g, or from 1.0 to 9.0 dl/g, or from 1.5 to 8.0 dl/g.

In one or more embodiments, the polyethylene used in conjunction with the polypropylene resin may be characterized by a density as measured per ASTM D4883 that is greater than 0.93 g/cc, or greater than 0.94 g/cc, or greater than 0.95 g/cc.

Polymers useful as the polyethylene used in conjunction with the polypropylene may be generally referred to as high density polyethylene resins. For example, useful high density polyethylene resins include those available under the tradename HDPE HD7960.13 (ExxonMobil).

Generally, the thermoplastic phase comprises from 5 to 75 wt %, such as from 7 to 60 wt %, such as from 10 to 55 wt % of the total weight of the thermoplastic vulcanizate composition.

Polysiloxanes

Polysiloxanes are silicon polymers in which the silicon atoms are bound to each other through oxygen atoms, with the silicon valences not taken up by oxygen being saturated by organic groups. The general formula for polyorganosiloxane compounds is $R_nSiO_{(4-n)/2}$, where n is 1 to 3. The free valences on the oxygen atoms determine the functionality of each siloxane unit so that the organosiloxanes can be either monofunctional (generally designated by the letter M), difunctional (generally designated by the letter D) or trifunctional (generally designated by the letter T). More information on the chemistry of polysiloxanes can be found in Walter Noll, Chemistry and Technology of Silicones, dated 1962, Chapter I, pages 1-23), the entire contents of which are incorporated herein by reference. The terms "polysiloxanes" and "polyorganosiloxanes" are used interchangeably herein.

Many polysiloxanes include those organosilicon polymers and oligomers including mer units having the formula —$R_2SiO$—, where each R is independently an organic group, such as a hydrocarbyl group, i.e. containing D functionality units. Exemplary types of hydrocarbyl groups in these compounds include alkyl, alkenyl, aryl. These polysiloxane compounds may also be referred to as silicones. Exemplary types of polysiloxanes include poly(hydro)(alkyl)siloxanes, polydialkylsiloxanes, polydiarylsiloxanes, and poly(hydro)(aryl)siloxanes, poly(alkyl)(aryl)siloxanes. Specific examples of polysiloxanes include polydimethylsiloxane, polydiethylsiloxane, polymethylethylsiloxane, polydipropylsiloxane, polydibutylsiloxane, polydiphenylsiloxane, poly(hydro)(methyl)siloxane, poly(hydro)(phenyl)siloxane, and poly(methyl)(phenyl)siloxane.

First Polysiloxane

The first polysiloxane comprises a migratory siloxane polymer which is a liquid at standard conditions pressure and temperature. A suitable first polysiloxane is a high molecular weight, essentially linear polydimethyl-siloxane (PDMS). Additionally, the first polysiloxane may have a viscosity at room temperature of about 100 to 100,000 cSt, such as about 1,000 to 10,000 cSt, or from greater than about 5000 up to about 10000 cSt.

In one or more embodiments, the first polysiloxane includes from about 10 to 15,000 or even more repeating units of the formula:

$$R_nSiO_{(4-n)/2},$$

wherein each R group is the same or different and is independently selected from monovalent hydrocarbon groups having from 1 to about 18 carbon atoms, n is from 0 to 4. In certain embodiments, R is an alkyl or aryl group having from 1 to about 8 carbon atoms, e.g., methyl, ethyl, propyl, isobutyl, hexyl, phenyl or octyl; an alkenyl group such as vinyl; or halogenated alkyl groups such as 3,3,3-trifluoropropyl. In particular embodiments, at least 50% of all R groups are methyl groups, and in certain of these embodiments, substantially all R groups are methyl groups.

In certain embodiments, the first polysiloxane also contains R groups that are selected based on the cure mechanism desired for the composition containing the first polysiloxane. Typically, the cure mechanism is either by means of condensation cure or addition cure, but is generally via an addition cure process. For condensation reactions, two or more R groups per molecule should be hydroxyl or hydrolysable groups such as alkoxy group having up to 3 carbon atoms. For addition reactions two or more R groups per molecule may be unsaturated organic groups, typically alkenyl or alkynyl groups, preferably having up to 8 carbon atoms. When a composition containing the first polysiloxane is to be cured by an addition reaction, then it is preferred that R be alkenyl group e.g., vinyl, allyl, 1-propenyl, isopropenyl or hexenyl groups.

In one or more embodiments, the first polysiloxane includes one or more polymers defined by the formula:

$$R_2R^1SiO[(R_2SiO)_x(RR^1SiO)_y]SiR_2R^1,$$

wherein each R is the same or different and is as previously described, preferably each R group is a methyl or ethyl group; $R^1$ is an alkenyl group, such as vinyl or hexenyl group; x is an integer and y is zero or an integer. In one embodiment, the second polysiloxane comprises two or more alkenyl groups.

One suitable commercially available material useful as the first polysiloxane is XIAMETER® PMX-200 Silicone Fluid available from Dow Corning.

Generally, the thermoplastic vulcanizate composition described herein contains from 0.2 to 20 wt %, such as from 0.5 to 15 wt %, such as from 0.5 to 10 wt % of the first polysiloxane.

Second Polysiloxane

The second polysiloxane comprises a non-migratory polysiloxane which is bonded to a thermoplastic material.

The second polysiloxane is reactively dispersed in a thermoplastic material, which may be any homopolymer or copolymer of ethylene and/or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. In one preferred embodiment, the thermoplastic material is a polypropylene homopolymer.

Suitable methods of reactively bonding a polysiloxane to an organic thermoplastic polymer, such as a polyolefin, are disclosed in International Patent Publication Nos. WO2015/132190 and WO2015/150218, the entire contents of which are incorporated herein by reference.

In some embodiments, the second polyorganosiloxane may comprise predominantly D and/or T units and contains some alkenyl functionalities, which assist in the reaction with the polymer matrix. There is a covalent bond between the polyorganosiloxane and the polypropylene.

In some embodiments, the second polyorganosiloxane has a number average molecular weight of 200,000 to 2,000,000 g/mole. The number average molecular weight of the reaction product of the polyorganosiloxane and the polymer matrix is normally at least 1.1 times, preferably at least 1.3 times, the number average molecular weight of the base polyorganosiloxane.

In some embodiments, the second polyorganosiloxane has a gum loading of between 20 and 50 wt %.

One suitable commercially available material useful as the second polyorganosiloxane is HMB-0221 available in the form of a masterbatch from Dow Corning.

Generally, the thermoplastic vulcanizate composition described herein contains from 0.2 to 20 wt %, such as from 0.2 to 15 wt %, such as from 0.2 to 10 wt % of the second polysiloxane.

Additional Additives

The thermoplastic vulcanizate composition describe herein may include any or all of the optional additives conventionally included in thermoplastic elastomer compositions.

Fillers that may optionally be included include those reinforcing and non-reinforcing fillers or extenders that are conventionally employed in the compounding of polymeric materials. Useful fillers include carbon black, calcium carbonate, clays, silica, talc, and titanium dioxide.

Plasticizers, extender oils, synthetic processing oils, or a combination thereof may also be optionally added to the blend. The extender oils may include, but are not limited to, aromatic, naphthenic, and paraffinic extender oils. Exemplary synthetic processing oils are polylinear α-olefins, polybranched α-olefins, and hydrogenated polyalphaolefins. The compositions of this invention may include organic esters, alkyl ethers, or combinations thereof. U.S. Pat. Nos. 5,290,886 and 5,397,832 are incorporated herein in this regard. The addition of certain low to medium molecular weight organic esters and alkyl ether esters to the compositions of the invention dramatically lowers the Tg of the polyolefin and rubber components, and of the overall composition, and improves the low temperatures properties, particularly flexibility and strength. These organic esters and alkyl ether esters generally have a molecular weight that is generally less than about 10,000. It is believed that the improved effects are achieved by the partitioning of the ester into both the polyolefin and rubber components of the compositions. Particularly suitable esters include monomeric and oligomeric materials having an average molecular weight below about 2000, and preferably below about 600. The ester should be compatible, or miscible, with both the polyolefin and rubber components of the composition; i.e., that it mix with the other components to form a single phase. The esters found to be most suitable were either aliphatic mono- or diesters or alternatively oligomeric aliphatic esters or alkyl ether esters. Polymeric aliphatic esters and aromatic esters were found to be significantly less effective, and phosphate esters were for the most part ineffective. Synthetic polyalphaolefins are also useful in lowering Tg.

Oligomeric extenders may also optionally be used. Preferred oligomeric extenders include copolymers of isobutylene and butene or copolymers of butadiene together with a complementary comonomer. These oligomeric extenders typically have a number average molecular weight of less than 1,000. Useful oligomeric extenders are commercially available. For example, oligomeric copolymers of isobutylene and butene are available under the tradenames Polybutene™ (Soltex; Houston, Tex.), Indopol™ (BP; Great Britain), and Parapol™ (ExxonMobil). Oligomeric copolymers including butadiene are commercially available under the tradename Ricon Resin™ (Ricon Resins, Inc.; Grand Junction, Colo.).

Polymeric processing additives may also optionally be added. These processing additives may include polymeric resins that have a very high melt flow index. These polymeric resins include both linear and branched molecules that have a melt flow rate that is greater than about 500 dg/min, or greater than about 750 dg/min, or greater than about 1000 dg/min, or greater than about 1200 dg/min, or greater than about 1500 dg/min. Mixtures of various branched or various linear polymeric processing additives, as well as mixtures of both linear and branched polymeric processing additives may be used. The preferred linear polymeric processing additives are polypropylene homopolymers. The preferred branched polymeric processing additives include diene-modified polypropylene polymers. Thermoplastic vulcanizates that include similar processing additives are disclosed in U.S. Pat. No. 6,451,915, which is incorporated herein by reference.

The amounts of the cross-linkable rubber, thermoplastic polymer, first and second polysiloxanes and optional additives are typically controlled to produce a thermoplastic vulcanizate composition having a Shore A Hardness of less than 60, such as from 25 to 55 as measured by ASTM D2240.

Production of Thermoplastic Vulcanizate

The thermoplastic vulcanizate composition described herein is produced by supplying the cross-linkable rubber, the thermoplastic polymer, the first and second polysiloxanes and any option additives to a mixer, such as screw extruder, and then mixing the components under conditions such that the thermoplastic polymer melts and the rubber is at least partially cross-linked to produce a heterogeneous product comprising particles of the at least partially cross-linked rubber dispersed in a matrix comprising the thermoplastic polymer. Suitable conditions include a temperature from 170° C. to 250° C., such as from 190° C. to 230° C.

In a preferred embodiment, the second polysiloxane is supplied to the mixer together with the cross-linkable rubber and the thermoplastic polymer as a first mixture, while the first polysiloxane is supplied to the mixer after at least partial melting of the thermoplastic polymer to form a second mixture. That is, the second polysiloxane along with the cross-linkable rubber and the thermoplastic polymer are supplied to the mixer and well-mixed and at least partially melted to form a first mixture; thereafter, the first polysiloxane is added to the at least partially melted first mixture, and then mixed further to form a second mixture. For example, in the case of mixing in a screw extruder, the first polysiloxane may be added downstream of the resin supply hoppers part way along the barrel of the extruder.

The first polysiloxane is added after the mixing and the at least partial melting of the first mixture to ensure better mixing. However, if the first polysiloxane is added to the first mixture, then mixing efficiency may be reduced due to slip between the agitator in the mixer and second polysiloxane, the cross-linkable rubber and the thermoplastic polymer components.

Use of Thermoplastic Vulcanizate Composition

The thermoplastic vulcanizate composition described herein is useful in a variety of applications, especially in the production of articles, such as, for example, vehicle components, especially interior and exterior parts, for automobiles, airplanes, train cars, All Terrain Vehicles (ATVs), snowmobiles, boats, jet skis, motorcycles, and any other 2, 4 or more wheeled vehicles. Specific vehicle parts include, but are not limited to, exterior weather seals such as, glass run channels, corner molds, fuel door seals, body sealing low friction skin, trunk seals, tailgate seals, cowl seals, gap fillers, glass encapsulation, cut line seals, door seals, hood-to-radiator seals, windshield seals, sunroof seals, roof line seals, rear window seals, rocker panels, sashes, and belt-line seals, end-caps and others, for example. A particular belt-line seal is shown and described in U.S. Pat. No. 6,368,700. Other particular automotive exterior weather seals can be found at http:\\www.santoprene.com.

The invention will now be more particularly described with reference to the following, non-limiting Examples.

Comparative Example and Examples 1 to 6

Six different PP/EPDM TPV formulations according to the present disclosure (Examples 1 to 6) and a control injection molding grade PP/EPDM formulation (Comparative Example) were reactively compounded on a 53 mm, twin screw extruder pilot line with an L/D ratio of about 47. The details of these formulations are outlined in Table 1, in which the relative amounts of material in the formulations are listed on the basis of 100 parts of oil-free rubber. The EPDM rubber used is high MW Vistalon 3666 containing 64 wt % of ethylene (based on copolymerized ethylene and propylene only) and 3.5 wt % of ethylidenenorbornene (based on total rubber mass). V3666 contains 75 parts of Paralux 6001 paraffinic oil (Group II) per 100 parts of dry rubber. The PP in the formulation can be broadly divided into two categories, homo-PP and random copolymer of PP. Vistamaxx 3000 is also added as the second thermoplastic resin to help improve the bonding performance. The other chemicals added to the formulation include a carbon black master batch, a clay as a rubber partitioning filler. A curing package was added during compounding to dynamically vulcanize the rubber phase. Additional quantities of Group II Paralux 6001 oil were also fed to the extruder to extend the rubber phase and maintain processability. In Examples 1 to 6 an immobile or non-migratory type of ultra-high molecular weight polysiloxane, HMB-0221, along with a mobile or migratory type of silicone oil, DC200, are used. The masterbatch pellets were fed at the hopper while silicone oil was fed directly to the extruder downstream of the hopper. In the case of the Comparative Example, only the silicone oil, DC200, was added again downstream of the hopper.

TABLE 1

| Raw Material | Comp. PHR | Ex. 1 PHR | Ex. 2 PHR | Ex. 3 PHR | Ex. 4 PHR | Ex. 5 PHR | Ex. 6 PHR |
|---|---|---|---|---|---|---|---|
| V3666B Rubber (Paralux 6001R) | 175.0 | 175.0 | 175.0 | 175.0 | 175.0 | 175.0 | 175.0 |
| Paralux 6001R Oil | 121.0 | 125.0 | 125.0 | 121.0 | 121.0 | 125.0 | 121.0 |
| Homo PP (Braskem F180A) | 19.1 | 9.1 | 9.1 | 19.1 | 14.1 | | |
| RCP (Adsyl 5C30F) | | | | | | 9.1 | 14.1 |
| Vistamaxx 3000 | 40.0 | 20.0 | 30.0 | 40.0 | 40.0 | 30.0 | 40.0 |
| DC HMB-0221 | | 25.0 | 25.0 | 25.0 | 20.0 | 25.0 | 20.0 |
| DC200 Fluid (5000 cSt) | 16.0 | 16.0 | 16.0 | 16.0 | 16.0 | 16.0 | 16.0 |
| Clay filler | 12.0 | 12.0 | 12.0 | 12.0 | 12.0 | 12.0 | 12.0 |
| Carbon black filler | 5.0 | 5.0 | 5.0 | 5.0 | 5.0 | 5.0 | 5.0 |
| Curing package | 13.7 | 15.7 | 15.7 | 13.7 | 13.7 | 15.7 | 13.7 |
| Total | 401.8 | 402.8 | 412.8 | 426.8 | 416.8 | 412.8 | 416.8 |

The pellets were injection molded into 4×6"×2 mm plaques and the physical properties, such as Hardness, tensile and COF, were measured. The dogbones for tensile testing were punched out across the flow direction and the testing was carried out using ASTM D412 protocol at room temperature. The hardness was measured using D2240, Shore A, 15 seconds. The COF properties were measured against a glass lens. In this test the glass lens, attached to a sled, is moved against a 10 mm wide strip cut out of the 2 mm thick injection molded plaque at a 600 mm/min speed and using a 350 gms of weight. For compression set measurement, the pellets were molded into 0.5" thick plaque and the buttons were drilled out. The measurements were then carried out on these buttons under 25% compression for 22 hrs, and at RT and an elevated temperature of about 70° C. The capillary measurement were carried out at 204° C. using twin-bore Rosand capillary rheometer and the data was corrected using Bagley and Rabinowitsch corrections. The viscosity at $1200\ s^{-1}$ was calculated based on fitting linear regression to the corrected viscosity vs shear rate data. Bonding to sponged EPDM was measured by first preparing a joint dogbone specimen and then testing it in the Instron machine. The joint dog bone was prepared by directly injection molding half of the specimen over another half of sponged EPDM substrate. The half of sponged EPDM substrate was prepared by cutting in the middle of the whole substrate. The whole sponged dogbone was punched out of an extruded tape.

The test results are summarized in Table 2, from which it will be seen that the Comparative Example shows a typical desired formulation around 40 Shore A hardness with quite acceptable bonding strength but very high COF value. Inventive Example 1 shows that adding silicone MB to the control formulation and reducing the Vistamaxx content provide the formulation with target hardness and much lower COF values but reduces the bonding strength. The bonding strength is further improved and the COF performance is maintained by increasing the amount of Vistamaxx in next two Inventive Examples 2 and 3. Inventive Example 4 demonstrates a further optimized formulation showing a hardness much closer to 40 Shore A along with the lowest COF and improved bonding performance Inventive Examples 5 and 6 make use of a random copolymer of polypropylene to obtain a lower hardness formulation with improved bonding performance as compared their low COF counterparts Examples 2 and 4 while achieving lower COF and maintaining/improving bonding compared to the Comparative Example.

Various modifications and alterations that do not depart from the scope and spirit of this invention will become apparent to those skilled in the art. This invention is not to be duly limited to the illustrative embodiments set forth herein.

TABLE 2

| # | Property | Measurement Details | Unit | | Comp. | Ex. 1 | Ex. 2 | Ex. 3 | Ex. 4 | Ex. 5 | Ex. 6 |
|---|---|---|---|---|---|---|---|---|---|---|---|
| 1 | Hardness | RT, 15 s, ASTM D2240 | Shore A | Avg | 40.0 | 38.2 | 39.8 | 44.6 | 43.6 | 37.6 | 39.7 |
| | | | | SD | 1.4 | 0.2 | 0.0 | 0.5 | 0.5 | 0.4 | 0.4 |
| 2 | Capillary | 204° C. @ 1200 s | Pa · s | Avg | 34.4 | 31.4 | 31.2 | — | 32.9 | 26.8 | 30.1 |
| 3 | Tensile Properties | M 100, RT, ASTM D412 | MPa | Avg | 1.2 | 1.0 | 1.1 | 1.5 | 1.2 | 1.0 | 1.1 |
| | | Stress @ Break, RT, ASTM D412 | MPa | Avg | 2.7 | 2.4 | 2.3 | 2.3 | 2.5 | 2.3 | 2.6 |
| | | Elongation @ Break, RT, ASTM D412 | % | Avg | 383 | 305 | 312 | 296 | 388 | 338 | 368 |
| 4 | Compression Set | 22 hrs @ RT | % | Avg | 9.7 | 12.7 | 12.4 | 16.8 | 19.2 | 11.3 | 10.4 |
| | | | | SD | 3.9 | 0.9 | 0.6 | 1.5 | 2.5 | 0.8 | 1.4 |
| 5 | | 22 hrs @ 70° C. | % | Avg | 29.9 | 21.7 | 26.9 | | 33.2 | 30.5 | 32.8 |
| | | | | SD | 2.6 | 1.0 | 1.2 | | 2.7 | 1.9 | 4.1 |
| 6 | COF | Static | | Med | 2.04 | 0.88 | 0.81 | 0.84 | 0.71 | 1.08 | 1.26 |
| 7 | | Kinetic | | Med | 1.33 | 0.72 | 0.66 | 0.57 | 0.47 | 0.78 | 1.03 |
| 8 | Boding to Sponged EPDM | Stress | MPa | Avg | 0.78 | 0.58 | 0.70 | 0.95 | 0.90 | 0.75 | 0.85 |
| | | Strain | % | Avg | 68 | 70 | 85 | 69 | 91 | 97 | 109 |

RT = Room Temperature

The invention claimed is:

1. A thermoplastic vulcanizate composition comprising:
   (i) a dispersed phase of rubber that is at least partially cured;
   (ii) a continuous thermoplastic phase including at least one thermoplastic polymer;
   (iii) a first polysiloxane comprising a migratory liquid siloxane polymer and
   (iv) a second polysiloxane comprising a non-migratory siloxane polymer bonded to a thermoplastic material wherein the second polysiloxane is formed by reactively bonding the non-migratory siloxane polymer to the thermoplastic material.

2. The composition of claim 1, wherein the rubber phase (i) comprises an ethylene propylene diene terpolymer.

3. The composition of claim 2, wherein the ethylene propylene diene terpolymer comprises from 40 wt % to 85 wt % ethylene based on the total weight of ethylene and propylene.

4. The composition of claim 1, comprising from 10 wt % to 80 wt % of the rubber phase (i) based on the total weight of the thermoplastic vulcanizate composition.

5. The composition of claim 1, wherein the thermoplastic phase (ii) comprises a propylene ethylene copolymer.

6. The composition of claim 5, wherein the thermoplastic phase (ii) comprises polypropylene homopolymer.

7. The composition of claim 1, comprising from 5 wt % to 75 wt % of the thermoplastic phase (ii) based on the total weight of the thermoplastic vulcanizate composition.

8. The composition of claim 1, wherein the first thermoplastic material in (iii) or the second thermoplastic material in (iv) is selected from polyethylene, polypropylene or a homopolymer or a copolymer thereof.

9. The composition of claim 1, comprising from 0.1 wt % to 20 wt % of the first polysiloxane (iii) based on the total weight of the thermoplastic vulcanizate composition.

10. The composition of claim 1, wherein second polysiloxane (iv) is bonded with polypropylene.

11. The composition of claim 1, comprising from 0.2 wt % to 20 wt % of the second polysiloxane (iv) based on the total weight of the thermoplastic vulcanizate composition.

12. The composition of claim 1, wherein the weight ratio of the second polysiloxane to the first polysiloxane is no more than 1.

13. The composition of claim 1, wherein the composition has a Shore A Hardness of less than 50 as measured by ASTM D2240.

14. A process for producing a thermoplastic vulcanizate composition, the process comprising:
   (a) supplying to a mixer at least the following components: (i) a cross-linkable rubber, (ii) a thermoplastic polymer, (iii) a first polysiloxane comprising a migratory liquid siloxane polymer and (iv) a second polysiloxane comprising a non-migratory siloxane polymer bonded to a thermoplastic material wherein the second polysiloxane is formed by reactively bonding the non-migratory siloxane polymer to the thermoplastic material; and
   (b) mixing the components under conditions such that the thermoplastic polymer melts and the rubber is at least partially cross-linked to produce a heterogeneous product comprising particles of the at least partially cross-linked rubber dispersed in a matrix comprising the thermoplastic polymer.

15. The process of claim 14, wherein the second polysiloxane is supplied to the mixer together with the cross-linkable rubber (i) and the thermoplastic polymer (ii) and the first polysiloxane is supplied to the mixer after at least partial melting of the thermoplastic polymer.

16. The process of claim 14, wherein the first thermoplastic material in (iii) or the second thermoplastic material in (iv) comprises polyethylene or polypropylene.

17. The process of claim 14, wherein the second polysiloxane (iv) is bonded with polypropylene.

18. The process of claim 14, wherein a curing composition is supplied to the mixer in (a).

19. A vehicle component comprising the thermoplastic vulcanizate composition of claim 1.

20. The vehicle component of claim 19, wherein said component is selected from the group consisting of exterior weather seals such as molded corners, molded end-caps, glass run channels, trunk seals, tailgate seals, cowl seals, gap fillers, glass encapsulation, cut line seals, door seals, hood-to-radiator seals, windshield seals, sunroof seals, roof line seals, rear window seals, rocker panels, sashes, and belt-line seals.

21. A thermoplastic vulcanizate composition comprising:
   (i) a dispersed phase of rubber that is at least partially cured and comprising an olefinic elastomeric copolymer, a butyl rubber, or a mixture thereof;

(ii) a continuous thermoplastic phase including at least one thermoplastic polymer comprising an olefin homo or copolymer;
(iii) a first polysiloxane comprising a migratory liquid siloxane polymer and
(iv) a second polysiloxane comprising a non-migratory siloxane polymer bonded to a thermoplastic material.

* * * * *